United States Patent Office 3,314,005
Patented Apr. 11, 1967

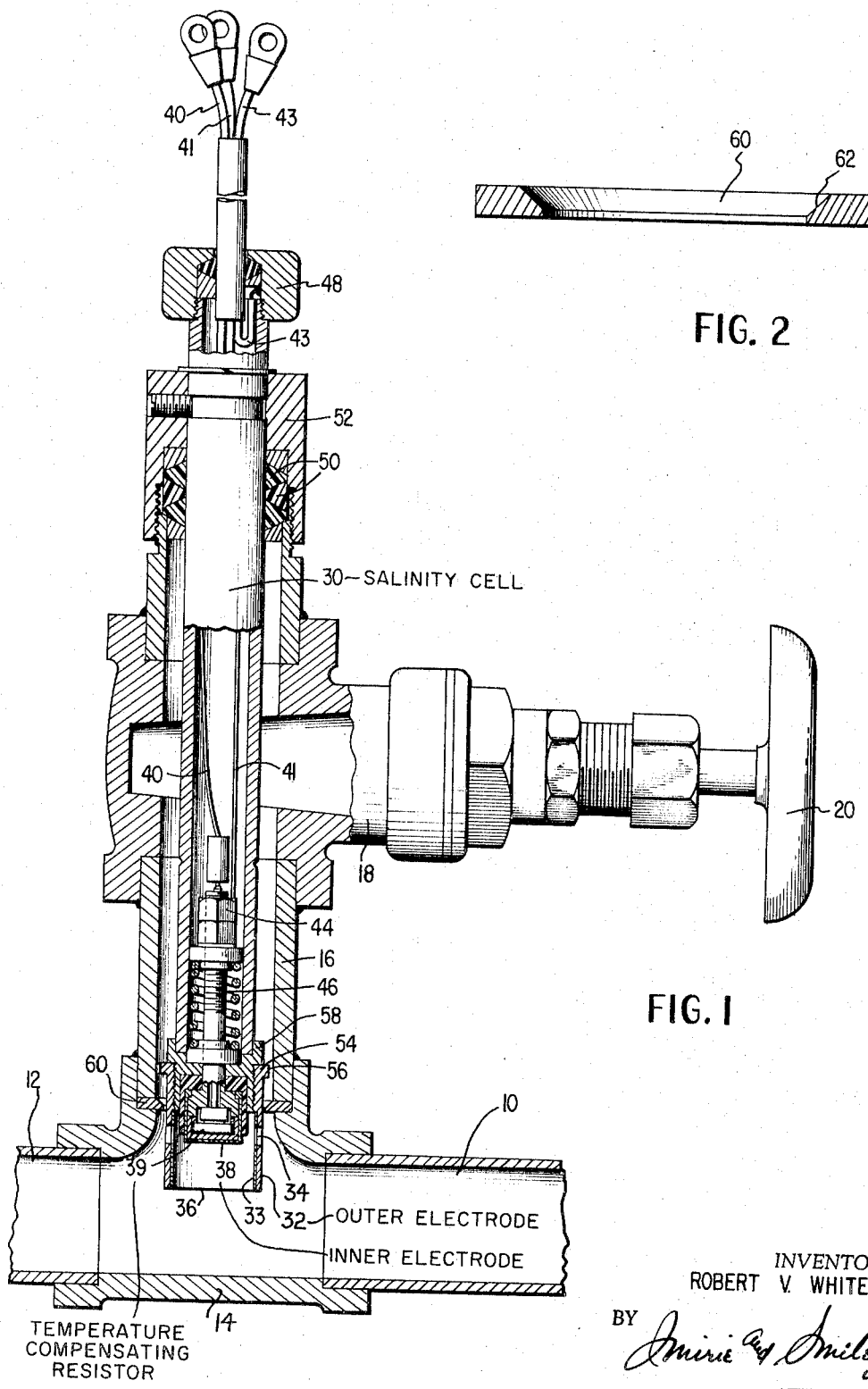

3,314,005
RETAINER FOR SALINITY CELL IN COMBINATION OF FLOW THROUGH PIPE, NIPPLE AND VALVE
Robert V. Whitener, Huntington, N.Y., assignor to Marine Electric Corporation, Brooklyn, N.Y., a corporation of New York
Filed Dec. 3, 1963, Ser. No. 327,671
5 Claims. (Cl. 324—30)

This invention relates generally to salinity cells and more particularly to an improved retainer for installing a salinity cell in a flow pipe system whereby danger of loss of the separable outer electrode, or other parts of the cell, to enter the pipe system with consequent damage to pump impellers, or the like, is positively prevented.

Salinity cell and valve combinations are frequently provided in pressurized water systems in which the salinity cell can be removed and replaced without interrupting the water pressure service of the system. In such combinations the outer electrode of the salinity cell is made readily removable from the remainder of the cell for proper access to clean the electrode. Removal of the salinity cell is necessitated not only by normal maintenance, cleaning and repair but for periodic testing of the cells to ensure that they are properly calibrated. In such installations, even though the outer electrode is pinned, lock washered, plastically seized, or jammed it is still nevertheless possible, under certain vibration, pressure and temperature conditions encountered, to separate the outer electrode, or other parts, and under pressure of the system to pass these parts into the flow line pipes of larger size. This of course is likely to cause damage to pump impellers or "runners" of the pressure system.

To overcome this defect, one conventional salinity cell installation utilizes a cage, with holes, or openings, formed about the electrodes to permit access of the pressure fluid to the electrodes, but to prevent loss of the electrode into the flow pipe system. Such cage arrangements reduce, or divert, the stream flow from the cell sensing electrode elements and introduce a combination of thermal and conductivity error. The two combined errors result in poor salinity detection.

It is a primary object of the present invention to provide retaining means for a salinity cell, installed in a flow pipe system, which will obviate the above stated disadvantages of conventional installations, and will positively prevent the loss into the piping of the separable outer electrode of the salinity cell, or any other parts of the cell, which may accidentally be dislodged therefrom during operation, overhaul and repair, cleaning and maintenance, testing or other conditions.

It is a further object of the present invention to provide a salinity cell retaining means, of the above described characteristics, wherein the liquid access, thermal and electrical characteristics of the cell during operation are unmodified and not materially affected by the retaining means.

A still further object of the invention is to provide a salinity cell retaining means, of the above described characteristics, which is of simple and inexpensive construction, and easy and economical to make and install.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 1 is an elevational view of a preferred embodiment of the invention in which portions are broken away and shown in axial section;

FIG. 2 is a sectional view taken centrally of the retaining means utilized in FIG. 1;

Figure 3:
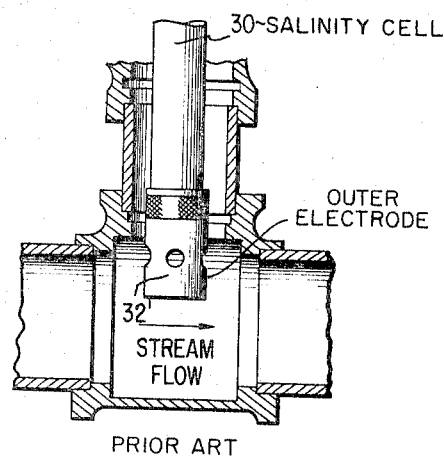
FIG. 3 is a reduced sectional diagram of a portion of a conventional salinity cell installation.

Referring now more particularly to the drawings, in FIG. 1 is illustrated a preferred embodiment of the invention installed in a pressure flow pipe system. The pipe system is partially shown as comprising the pipes 10 and 12 connected by a T 14. To the T is brazed a nipple 16 to which in turn is fixedly secured by brazing, or other suitable manner, a valve 18 having an operating handle 20.

Passing through the valve and through the nipple is a salinity cell 30 having an outer electrode 32 whose free end projects into the pipe system 10 and 12 so that liquid flowing therein makes intimate contact with the outer electrode and passes into the salinity cell through the openings 34, as well as through the open end 36 of the electrode 32.

Except in one respect, to be later described, the salinity cell may be of conventional construction and, as represented in FIG. 1, includes the metal outer electrode 32, lined with platinum 33, a metal inner electrode 38 also platinum lined, and a temperature compensating resistor 39 connected in series therewith and to the wire lead 40. A second wire lead 41 is connected to the inner electrode 38 through the nut 44 and metal sleeve 46. A third wire lead 43 is connected to the external, or outer electrode 32, at the nut 48 on the metal tube enclosing cell 30. The salinity cell 30 is secured centrally in the valve 18 and nipple 16 by a plurality of tapered packing rings 50 held on a nipple extension by the packing nut 52.

Further details of construction and mode of operation of the valve and the salinity cell being conventional, are not discussed herein. Suffice it to say that, for purposes of testing and calibration, cleaning, repair and general maintenance of the salinity cell and its outer electrode, it is frequently necessary to withdraw the salinity cell 30 from the valve without losing pressure in the pipe system. To this end the packing nut 52 is loosened and backed off so that pressure on the free end of the salinity cell will force the salinity cell outwardly through the valve and loosened packing rings 50 until the free end 36 of the outer electrode clears the tapered valve member, not shown, in the cavity at the center of the valve. When the salinity cell has reached this clearance position, the valve may be closed by operating the hand wheel 20. The salinity cell then may be entirely removed, for any one of the various purposes specified above, without loss of liquid from or pressure in the pipe system.

The novel features of the invention embody the following two structural features. First, the outer electrode is formed with a flange, or collar 54, preferably knurled on its perimeter at 56 and which projects slightly outwardly from the exterior surface of the cell 30 and its outer electrode 32. This collar is useful in applying a tool to thread the electrode on or off the brass adapter 58 which secures it to the brass tube 30 forming the enclosing body of the salinity cell. Secondly, a washer 60 is inserted in the T 14 against a shoulder therein and held in such position by the nipple 16 when the latter is brazed to the T. The washer 60 has an inner opening smaller than the collar 54 on the cell outer electrode, and projects into the aligned bores of the T and nipple to obstruct passage of the outer electrode should it accidentally separate from the body of the salinity cell. Desirably at least a portion of the wall defining the opening of the washer 60 is provided with a taper 62, of conical shape, whose larger diameter faces outwardly of the pipe system and toward the valve. The smallest diameter of the washer opening is larger than the diameter of the outer electrode 32 and, as clearly shown in FIGS. 1 and 5, the collar 54 is spaced from the washer in the direction away from the pipe system 10, 12 when the salinity cell is in operating position within the nipple. Accordingly, even if the washer is formed of metal, as is preferable although other materials may obviously be used, the washer is, in normal operating position, spaced from the outer electrode of the salinity cell and out of electrical contact. The washer 60 is of such small body size and so positioned as not to obstruct the flow of liquid in the pipe system against and into the sensitive electrode portions of the salinity cell. Therefore, the presence of the washer does not in any way affect the salinity readings. The opening and tapered wall 62 of the washer provide positioning means effective to guide the salinity cell during the times it is being extracted from or inserted in the pipe system.

FIG. 3 diagrams a conventional salinity cell installed in the same manner as the described installation of FIG. 1 but without the retaining washer 60 and collar 54 of the present invention. It is obvious, therefore, from FIG. 4, that should the outer electrode 32' accidentally become separated from the salinity cell it can readily fall into and be drawn by suction through the pipe system to locations where it can damage pump parts.

Figure 4:
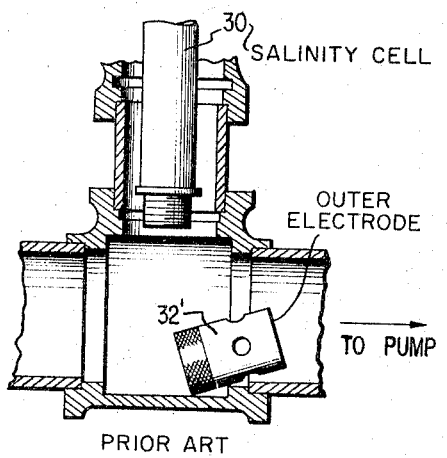
FIG. 4 is a view similar to FIG. 3 showing the outer electrode accidentally dislodged and dropped into the pipe flow system.
Figure 5:
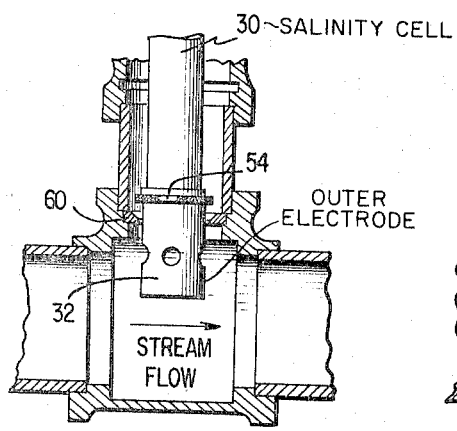
FIGS. 5 and 6 are diagrammatic views similar to FIGS. 3 and 4, respectively, illustrating the safeguards involved in the use of the retaining means of the present invention.
Figure 6:
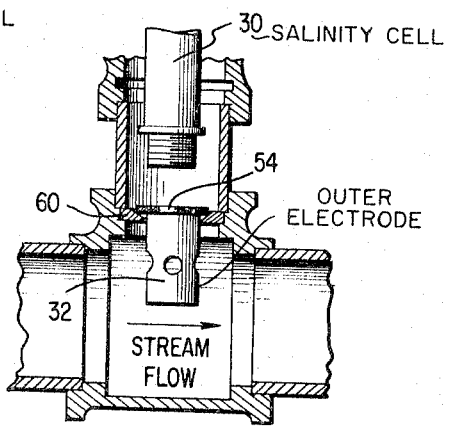

FIGS. 5 and 6, corresponding to FIGS. 3 and 4 respectively, diagram the construction according to the invention wherein the washer 60 is utilized and restricts the nipple bore to a diameter less than that of the collar 54 on the outer electrode 32. With this construction, should the electrode 32 become separated accidentally from the salinity cell 30, the collar 54 will come to rest against the washer 60 where it will remain until removed, without entering the pipe system and without possibility of damage to parts thereof.

While the retaining washer 60 has been described to be of washer form and made of metal such as brass obviously other shapes and other materials are of possible use. Nor is the horizontal disposition of the retaining washer, shown and described, essential as other locations and dispositions are possible without loss of the disclosed advantages.

It will be apparent from the above description that the retaining means provided by the present invention is of simple and economic construction, easy to make and install. At the same time the retainer avoids the need for designing novel and freak valve arrangements. With the retainer, the electrodes of the salinity cell are properly inserted and positioned most advantageously to be in direct maximum contact with the full flow of the liquid stream, unimpeded by cages, checks, bypasses, annular passages, slots or anything similar that would hinder conduction characteristics or heat transfer to the sensing salinity cell.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. In a flow through pipe having a nipple, a valve secured to said nipple and a removable salinity cell with a separable outer electrode installed in and extending through said valve and nipple so that the outer end of said outer electrode projects into the path of and is subjected to flow of liquid in said flow through pipe without obstruction, the improvements comprising projecting means secured to said nipple and flow through pipe and extending inwardly of said bore of said nipple, said outer electrode having a flange projecting outwardly of the salinity cell for engagement with said projecting means, and said flange being positioned within said nipple spaced from said projecting means on the side away from said flow through pipe, whereby said projecting means will upon accidental separation of said outer electrode from said salinity cell prevent passage of said outer electrode from said nipple into said flow through pipe.

2. In a flow through pipe having a nipple, a valve secured to said nipple and a removable salinity cell with a separable outer electrode installed in and extending through said valve and nipple so that the outer end of said outer electrode projects into the path of and is subjected to flow of liquid in said flow through pipe, the improvements comprising a washer secured to said nipple and flow through pipe and having an opening of smaller diameter than the bore of said nipple so that its inner edge projects inwardly of the inner surface of said nipple, said outer electrode having a radial flange of larger diameter than said opening of said washer, and said flange being positioned within said nipple spaced from said washer on the side away from said flow through pipe, whereby said washer will upon accidental separation of said outer electrode from said salinity cell prevent passage of said outer electrode from said nipple into said flow through pipe.

3. The combination having the improvements as set forth in claim 2 wherein said washer opening has a conical wall whose largest diameter is on the side away from said flow through pipe.

4. The combination having the improvements as set forth in claim 2 wherein said outer electrode is threadedly engaged with said salinity cell for separation therefrom for testing, repair, maintenance and cleaning purposes.

5. The combination having the improvements as set forth in claim 2 wherein said salinity cell when installed for operation has its said outer electrode axially centered in said opening of said washer without touching the walls thereof.

References Cited by the Examiner
UNITED STATES PATENTS 2,450,459  10/1948  Thomson _____ 324—30
2,810,879  10/1957  Cade et al. _____ 324—30

RUDOLPH V. ROLINEC, Primary Examiner.

WALTER L. CARLSON, Examiner.

C. F. ROBERTS, Assistant Examiner.